March 22, 1949.   G. W. REAM   2,465,037
STABILIZER FOR CHILD'S CARRIAGE
Filed Nov. 26, 1945   2 Sheets-Sheet 1
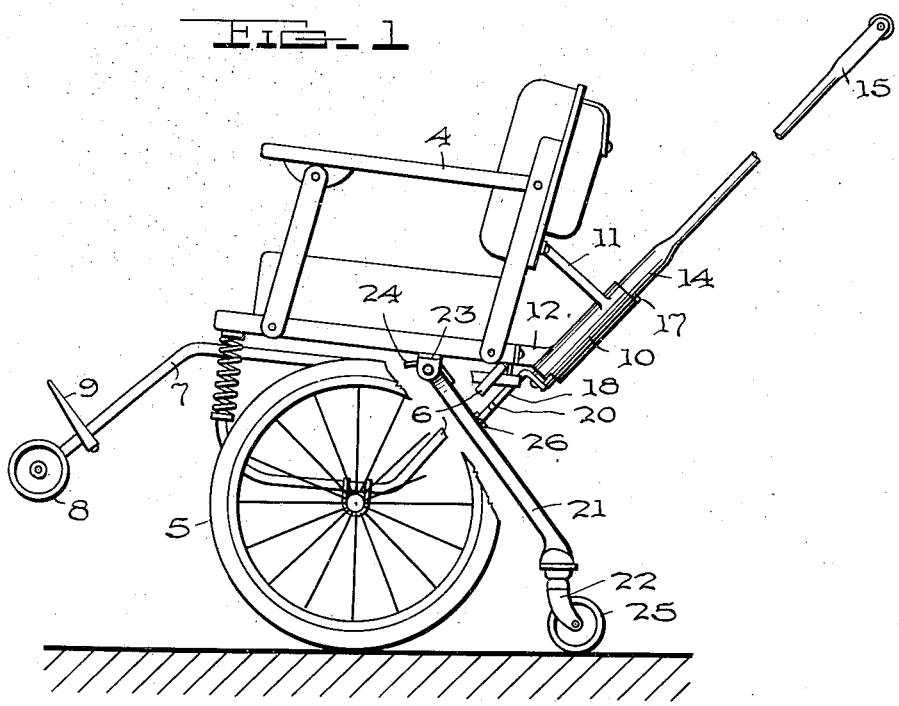
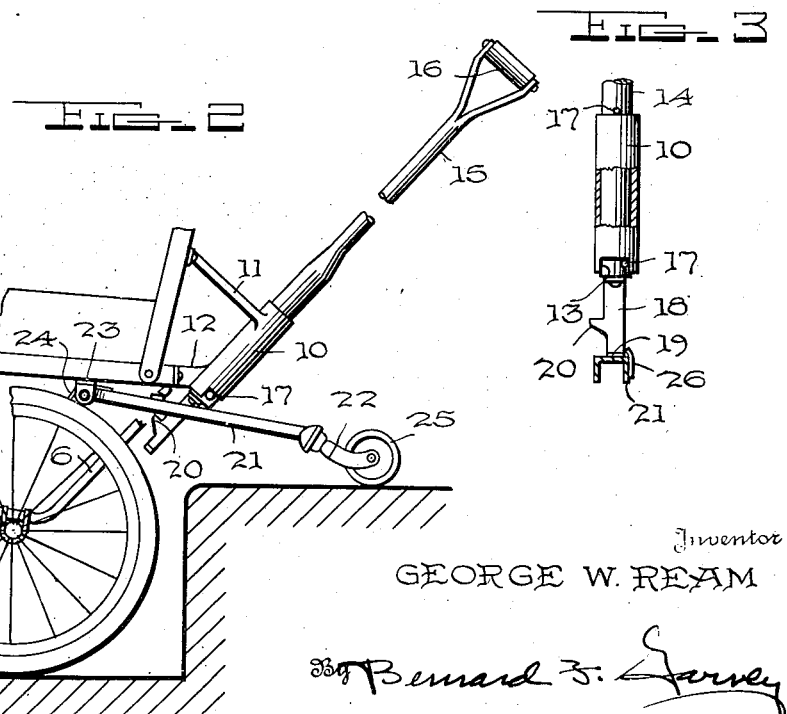
Inventor
GEORGE W. REAM
By Bernard F. Garvey
Attorney March 22, 1949. G. W. REAM 2,465,037
STABILIZER FOR CHILD'S CARRIAGE
Filed Nov. 26, 1945 2 Sheets-Sheet 2
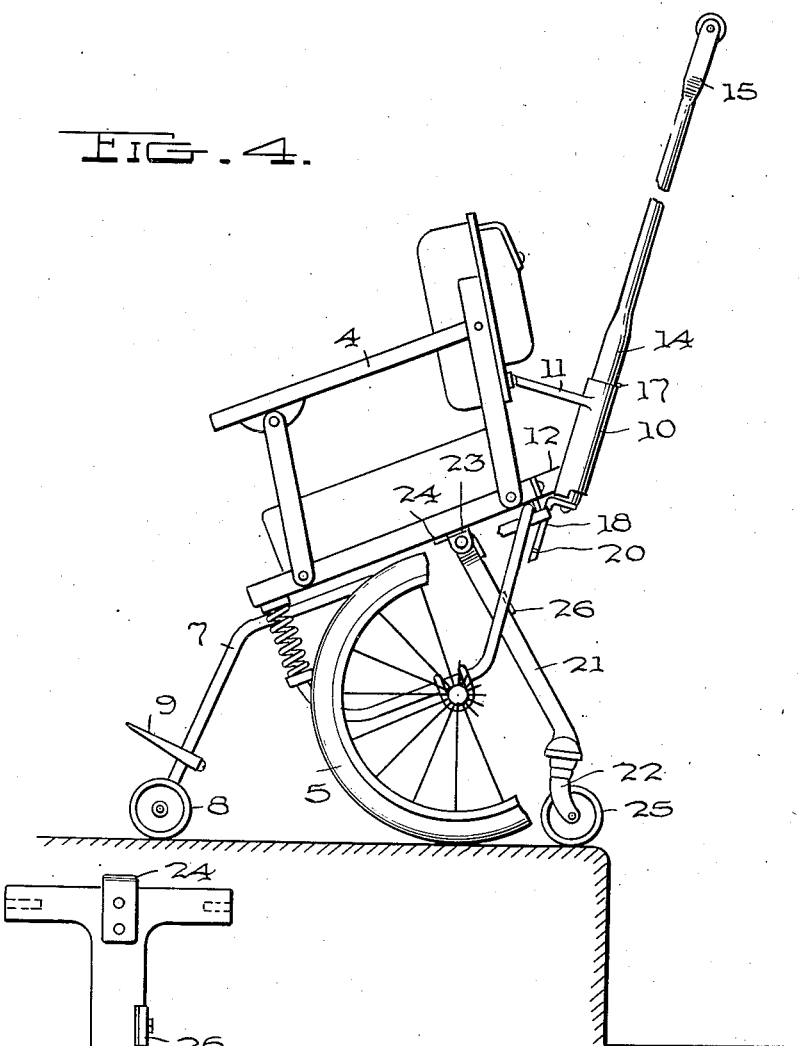
Inventor
GEORGE W. REAM
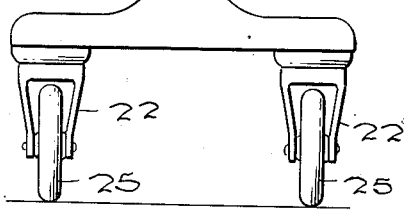
Attorney Patented Mar. 22, 1949

2,465,037

UNITED STATES PATENT OFFICE 2,465,037

STABILIZER FOR CHILD'S CARRIAGE

George W. Ream, Johnstown, Pa.

Application November 26, 1945, Serial No. 630,727

6 Claims. (Cl. 280—29)

This invention comprises an attachment for a child's carriage, especially of the two wheeled type, wherein a stabilizer is employed.

Objects of this invention are to equip a two wheeled carriage with suitable means to facilitate operation, prevent fore and aft "dumping," and allow transportation from one level to another without inconvenience to or strain on the operator and without in any way disturbing the carriage occupant.

It is within the contemplation of the invention to provide an attachment applicable to any two wheel vehicle, although having especial adaptation to child's carriages or perambulators, operation of the attachment being at all times within the control of the operator, through the vehicle handle, making it unnecessary for the operator to at any time interrupt the movement of the vehicle or to remove the hand from the vehicle handle.

The invention includes a handle of simple construction, corelated with a vehicle stabilizer in a manner to effect the desideratum of the invention by a slight torsional movement of the handle.

Other objects will be apparent from the following description of the present preferred form of the invention, wherein:

Figure 1 is a fragmentary side elevational view of a carriage constructed in accordance with the present invention showing the traction wheels and stabilizer wheel in engagement with the road of travel in the same plane;

Figure 2 is a similar view showing the stabilizer wheel in a plane above that of the traction wheel;

Figure 3 is a detail fragmentary sectional view of the carriage handle and bearing;

Figure 4 is a fragmentary side elevational view of the carriage, similar to Figure 1 showing the carriage ascending a curb or eminence with the stabilizer pending in a vertical disengaged position, and;

Figure 5 is a rear elevational view of the stabilizer.

The device of the present invention includes a carriage body generally designated 4 equipped with traction wheels 5 which are suspended from a frame 6 in any conventional manner, the frame being secured to the bottom of the carriage seat. A sub-frame 7 projects outwardly from the front of the carriage and has rollers 8 mounted on its terminals subjacent a foot rest 9.

The attachment includes particularly a cylindrical bearing housing 10 which is secured to the carriage back by braces 11 and to the carriage seat by braces 12. A portion of the lower rear end of the housing is removed to provide a recess 13 for a purpose more fully hereinafter set forth.

The housing 10 has rotatably mounted therein a shaft 14, the upper end of which issues into a handle 15, and is provided at its extreme upper terminal with a hand grip 16. The shaft 14 carries a pair of pins 17, which project radially from the periphery of the shaft, one immediately above the bearing housing 10, while the other, or lower pin, is mounted to move within the confines of the bearing housing recess 13.

Extending perpendicularly from the lower end of the shaft 14 and eccentric to the axis of the latter, is a metal strap 18, the upper end of which is bent at right angles and secured to the lower terminal of the shaft, as shown to advantage in Figure 3. The extreme lower end of the strap has its corners beveled as indicated at 19. One of the lateral margins of the strap is intermediately extended to provide a lug or detent 20.

Depending from the bottom of the seat of the carriage at a point aft of the axis of the traction wheels 5, is a stabilizer comprising a bar 21 and caster assembly 22. The upper end of the bar is pivotally mounted between ears 23 which pend from the bottom of the carriage seat. Interpositioned between the top of the stabilizer bar 21, and the bottom of the carriage seat, between the ears 23, is a yieldable contact plate 24. The caster assembly 22 includes an inverted U frame with wheels 25. As shown in Figure 3, the bar 21 is of substantially U shape in cross section, and carries a resilient locking plate 26, the upper margin of which projects beyond the upper face of the bar and is bent inwardly over the latter as shown in Figure 3.

In the normal operation of the carriage, the position of the latter is substantially shown in Figure 1. In this position, the beveled end of the strap 18 is engaged with the upper face of the bar 21 in order to retain the bearing wheel 25 in contact with the road of travel uniplanar with the base of the wheels 5.

Preparatory to descending a curb or other eminence, to a road of travel in a lower plane, the handle 15 is rotated in the bearing housing 10 permitting the strap 18, when the carriage is tilted slightly forwardly, to become disengaged from the stabilizer bar 21. As the carriage wheels 5 roll down over the curb or eminence, the bearing wheels 25 are intercepted and automatically elevated as shown in Figure 2. Should it be desired to retain the bearing wheels in this position, the handle is returned to its former position to engage the lug or detent 20 beneath the bar 21. When ascending a curb, the rollers 8 are first engaged with the curb, or eminence being approached by the carriage, in an obvious manner. The handle 15 is then elevated and urged forwardly until the wheels 5 contact the curb or eminence. During this cycle, the stabilizer bar is permitted to hang in a substantially vertical plane, as shown by Figure 4. After the curb has been ascended, the handle is returned to a normal position as shown in Figure 1. In being returned to said position, the strap 18 is permitted to flex over the plate 26 and thereby locked from lateral displacement so long as the bearing wheel 25 is engaged with the road of travel.

In use, the stabilized is so positioned so that the operator need not resort to an unnatural mode of locomotion while pushing the carriage. As shown in Figures 1 and 2, regardless of the position of the stabilizer, the wheeled lower end of the latter will at no time be in the path of movement of the operator. The stabilizer, when released, automatically swings from its pivot into the desired position of operation. The stabilizer is locked from displacement, when traversing a road of travel, and may be locked in its uppermost inoperative position if desired. This is accomplished by the simple expedient of a quarter turn of the handle 15. As is apparent, the handle 15 is the sole means employed for propelling the vehicle, for raising and lowering the vehicle, and for controlling the stabilizer.

While I have herein described the preferred embodiment of the invention, I am nevertheless aware that various changes may be made within the scope of the claims hereto appended.

What I claim is:

1. An attachment for a child's carriage comprising a wheeled body, a stabilizer pivoted on and depending from the body and engageable, when in a forward position, with the road of travel in the plane of contact of the carriage body wheels, the stabilizer, when in the opposite aft position, being engageable with the road of travel located in a plane above the plane of contact of said carriage body wheels, and a handle mounted on the carriage body in operable proximity to the stabilizer, to normally hold the latter from movement, the handle being rotatable about its own axis to release the stabilizer for swinging movement on its axis.

2. An attachment for a child's carriage comprising a wheeled body, a stabilizer pivoted on and depending from the body, the stabilizer being freely movable fore and aft between the wheels of the body and including casters engageable with the road of travel simultaneously with the wheels of the carriage, a handle for propelling the vehicle, the handle being movable on the wheeled body into and out of positions engaging the stabilizer to hold the casters either in engagement with the road, or elevated above the road of travel of the carriage wheels, optionally.

3. In a child's carriage, the combination of a wheeled body, a stabilizer comprising a caster-equipped bar pivoted at one end to the wheeled body to swing vertically, a handle rotatably mounted on the wheeled body, and means on the handle to engage the bar for selectively securing the latter in a lowered or raised position.

4. A stabilizer for attachment to a child's carriage comprising a bar adapted to be pivoted at one end thereof to the underside of the carriage seat, casters on the free end of the bar, a bearing housing adapted to be mounted on the rear side of the back of the carriage seat, a handle journaled in the bearing housing, and means on the handle to selectively engage the bar for holding the latter in either a lowered or elevated position.

5. In a child's carriage, the combination of a wheeled body, a stabilizer pivotally mounted thereon to swing vertically to either of two substantially extreme positions, and a handle mounted on the wheeled body to move relative thereto into and out of engagement with the stabilizer for holding the latter in a selected one of either of the two extreme positions.

6. In a child's carriage, the combination of a wheeled body, a stabilizer pivotally mounted on the body to swing vertically to either of two substantially extreme positions, a handle rotatably mounted on the wheeled body, and an eccentric on the handle for engagement with the stabilizer when in either of its extreme positions for releasably retaining the latter in that position.

GEORGE W. REAM.

REFERENCES CITED

The following references are of record in the file of this patent:

UNITED STATES PATENTS

| Number | Name | Date |
| --- | --- | --- |
| 642,464 | Lanciaux et al. | Jan. 30, 1900 |
| 1,191,394 | Brown et al. | July 18, 1916 |
| 1,226,848 | Black | May 22, 1917 |
| 1,327,864 | Everingham | Jan. 13, 1920 |
| 1,785,646 | Pascoo | Dec. 16, 1930 |
| 1,897,036 | Appenheimer et al. | Feb. 14, 1933 |